US012608319B1

(12) United States Patent
Li et al.

(10) Patent No.: US 12,608,319 B1
(45) Date of Patent: Apr. 21, 2026

(54) COMPUTING CORE, ACCELERATOR, COMPUTING METHOD AND APPARATUS, DEVICE, NON-VOLATILE READABLE STORAGE MEDIUM, AND SYSTEM

(71) Applicant: SUZHOU METABRAIN INTELLIGENT TECHNOLOGY CO., LTD., Suzhou (CN)

(72) Inventors: Rengang Li, Suzhou (CN); Hongbin Yang, Suzhou (CN); Gang Dong, Suzhou (CN); Dongdong Jiang, Suzhou (CN); Qichun Cao, Suzhou (CN); Kekun Hu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/154,296

(22) PCT Filed: Nov. 20, 2023

(86) PCT No.: PCT/CN2023/132743
§ 371 (c)(1),
(2) Date: Aug. 6, 2025

(87) PCT Pub. No.: WO2024/169293
PCT Pub. Date: Aug. 22, 2024

(30) Foreign Application Priority Data

Feb. 15, 2023 (CN) .......................... 202310114640.4

(51) Int. Cl.
*G06F 12/0877* (2016.01)
*G06F 13/28* (2006.01)
(Continued)

(52) U.S. Cl.
CPC .......... *G06F 12/0877* (2013.01); *G06F 13/28* (2013.01); *G06F 17/16* (2013.01); *G06N 3/063* (2013.01)

(58) Field of Classification Search
CPC ...... G06F 12/0877; G06F 13/28; G06F 17/16; G06N 3/063
See application file for complete search history.

(56) References Cited

U.S. PATENT DOCUMENTS 11,861,484 B2 * 1/2024 Bai ......................... G06N 3/045
2017/0277659 A1 * 9/2017 Akerib .................... G06F 17/16
(Continued)

FOREIGN PATENT DOCUMENTS

CN 106445471 A 2/2017
CN 109522125 A 3/2019
(Continued)

*Primary Examiner* — Mark A Giardino, Jr.
(74) *Attorney, Agent, or Firm* — IPro, PLLC

(57) ABSTRACT

Disclosed in the present application are a computing core, an accelerator, a computing method and apparatus, a device, a non-volatile readable storage medium, and a system in the technical field of computers. According to the present application, parallel computing can be performed to obtain matrix multiplication results of N rows of data or N columns of data in a first matrix and N columns of data or N rows of data in a second matrix, so that N final matrix multiplication results may be obtained at one time. And the computing efficiency and speed are improved. The computing core does not need to temporarily store an intermediate result, and are source-on-chip is saved. According to the present application, after the matrix multiplication results are obtained, which memory the matrix multiplication results are stored into can be determined according to a participation manner in which the matrix multiplication results participate in each round of computing in a next matrix multiplication operation, and hence, a storage format of the matrix multiplication results (Continued)

in the memory is consistent with an output format of the matrix multiplication results when participating in computing. Data is conveniently read in sequence in a continuous computing process, and matrix transposition does not need to be carried out. Therefore, the time overhead of accessing a memory can be reduced, and the efficiency is improved.

20 Claims, 7 Drawing Sheets

(51) Int. Cl.
    *G06F 17/16*        (2006.01)
    *G06N 3/063*       (2023.01)

(56)                   References Cited

U.S. PATENT DOCUMENTS

| | | | |
|---|---|---|---|
| 2022/0012304 A1* | 1/2022 | Kumar ................ | G06N 3/0495 |
| 2022/0188613 A1 | 6/2022 | Li et al. | |
| 2023/0021204 A1* | 1/2023 | Choudhury .......... | G06N 3/0464 |
| 2025/0103292 A1* | 3/2025 | Li ........................ | G06F 7/5443 |
| 2026/0023818 A1* | 1/2026 | Panda .................... | G06F 17/16 |

FOREIGN PATENT DOCUMENTS

| | | |
|---|---|---|
| CN | 111967582 A | 11/2020 |
| CN | 112214726 A | 1/2021 |
| CN | 113918120 A | 1/2022 |
| CN | 113947200 A | 1/2022 |
| CN | 115860080 A | 3/2023 |

* cited by examiner

| 1st row, 1st column | 1st row, 2nd column | 1st row, 3rd column | 1st row, 4th column | 2nd row, 1st column | 2nd row, 2nd column | 2nd row, 3rd column | 2nd row, 4th column |
|---|---|---|---|---|---|---|---|
| 3rd row, 1st column | 3rd row, 2nd column | 3rd row, 3rd column | 3rd row, 4th column | 4th row, 1st column | 4th row, 2nd column | 4th row, 3rd column | 4th row, 4th column |
| 1st row, 5th column | 1st row, 6th column | 1st row, 7th column | 1st row, 8th column | 2nd row, 5th column | 2nd row, 6th column | 2nd row, 7th column | 2nd row, 8th column |
| 3rd row, 5th column | 3rd row, 6th column | 3rd row, 7th column | 3rd row, 8th column | 4th row, 5th column | 4th row, 6th column | 4th row, 7th column | 4th row, 8th column |

FIG. 9

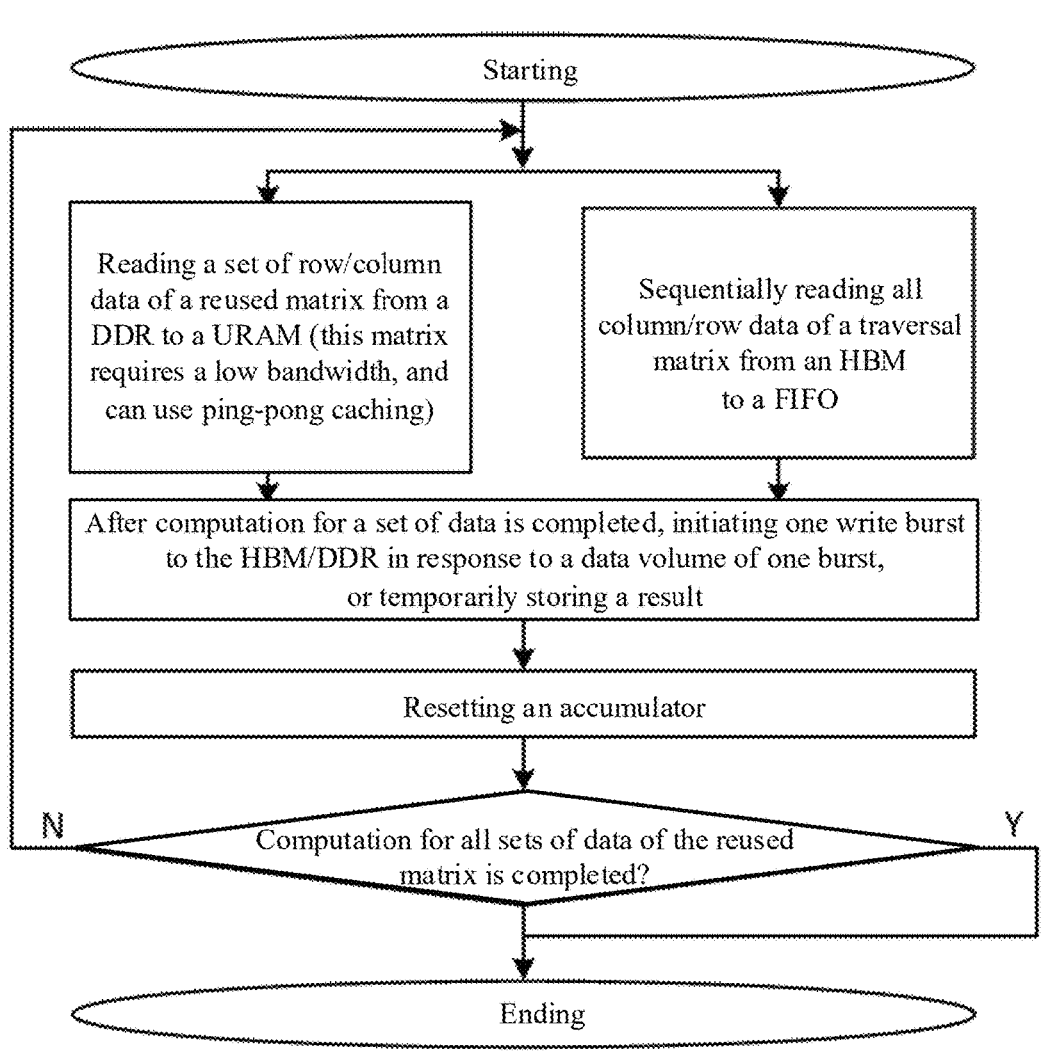

FIG. 10

COMPUTING CORE, ACCELERATOR, COMPUTING METHOD AND APPARATUS, DEVICE, NON-VOLATILE READABLE STORAGE MEDIUM, AND SYSTEM

CROSS-REFERENCE TO RELATED APPLICATION

This disclosure claims the priority of the Chinese Patent application filed on Feb. 15, 2023 before the CNIPA, China National Intellectual Property Administration with the application number of 2023101146404, and the title of "COMPUTING CORE, ACCELERATOR, COMPUTING METHOD AND APPARATUS, DEVICE, MEDIUM, AND SYSTEM", which is incorporated herein in its entirety by reference.

FIELD

The present disclosure relates to the field of computer technology, and in particular, to a computing core, an accelerator, a computing method and apparatus, a device, a non-transitory readable storage medium, and a system.

BACKGROUND

Currently, for matrix multiplication in a graph neural network, an existing computing component may perform a matrix multiplication operation through a matrix partitioning operation. However, in this manner, a large quantity of intermediate results need to be temporarily stored outside the computing component. When performing subsequent computation, the computing component reads the intermediate results back to a chip for accumulation, which causes many additional data movement operations, wastes computing resources, and reduces a computing speed.

Therefore, how to improve the computing speed and computing efficiency of the matrix multiplication operation in the graph neural network is a problem that needs to be solved by those skilled in the art.

SUMMARY

In view of this, an objective of the present disclosure is to provide a computing core, an accelerator, a computing method and apparatus, a device, a non-transitory readable storage medium, and a system, to improve a computing speed and computing efficiency of a matrix multiplication operation in a graph neural network. The solutions are as follows.

In a first aspect, the present disclosure provides a computing core, including a first cache component, a second cache component, a matrix multiplication computing component, and an output component;

the first cache component, configured to load data in a first matrix participating in a current matrix multiplication operation in a graph neural network from an external first memory according to a received computing instruction;

the second cache component, configured to load data in a second matrix participating in the current matrix multiplication operation from an external second memory according to the computing instruction;

the matrix multiplication computing component, configured to compute matrix multiplication results of N pieces of row data or N pieces of column data in the first matrix and N pieces of column data or N pieces of row data in the second matrix in parallel based on a parallel count N set in the computing instruction; and the output component, configured to temporarily store the matrix multiplication results, and write, in response to a data volume of the matrix multiplication results satisfying a preset write condition, the matrix multiplication results into the first memory or the second memory set in the computing instruction; and wherein, a transmission bandwidth of the second memory is greater than that of the first memory. In response to the matrix multiplication results needing to participate in computation in a traversal manner participating in each round of computation in a next matrix multiplication operation, the computing instruction is set with the second memory; or in response to the matrix multiplication results having no need to participate in computation in a traversal manner participating in each round of computation in a next matrix multiplication operation, the computing instruction is set with the first memory.

Optionally, the first cache component is configured to load remaining unloaded data in the first matrix participating in the current matrix multiplication operation from the first memory during computation of the matrix multiplication results by the matrix multiplication computing component; and correspondingly, the second cache component is configured to load remaining unloaded data in the second matrix participating in the current matrix multiplication operation from the second memory during computation of the matrix multiplication results by the matrix multiplication computing component.

Optionally, the first cache component loads the data in the first matrix in a ping-pong mode.

Optionally, the second cache component loads the data in the second matrix using a first in first out queue.

Optionally, the matrix multiplication computing component includes at least one computing unit, and the computing unit includes a multiplier and an accumulator, with a data volume per computation equal to N.

In a second aspect, the present disclosure provides an accelerator, including a controller, a first memory, a second memory whose transmission bandwidth is greater than that of the first memory, and the above computing core;

the controller is respectively connected to the first memory, the second memory, and the computing core, and the computing core is respectively connected to the first memory and the second memory;

the controller is configured to send a computing instruction for a matrix multiplication operation in a graph neural network to the first memory, the second memory, and the computing core;

the first memory is configured to obtain and store, in a direct memory access (DMA) mode according to the computing instruction, a first matrix participating in a current matrix multiplication operation;

the second memory is configured to obtain and store, in the DMA mode according to the computing instruction, a second matrix participating in the current matrix multiplication operation; and the computing core is configured to compute a matrix multiplication result of the first matrix and the second matrix according to the computing instruction.

Optionally, there are a plurality of computing cores.

Optionally, the controller is further configured to control the plurality of computing cores to perform a same matrix multiplication operation.

Optionally, the controller is configured to: in response to controlling the plurality of computing cores to perform the same matrix multiplication operation, cause each computing core to compute a matrix multiplication result of a same row of data or a same column of data in the first matrix and a different column of data or a different row of data in the second matrix in a same computing cycle.

Optionally, the controller is configured to: in response to controlling the plurality of computing cores to perform the same matrix multiplication operation, cause each computing core to compute a matrix multiplication result of a different column of data or a different row of data in the first matrix and a same column of data or a same row of data in the second matrix in a same computing cycle.

Optionally, the controller is further configured to control different computing cores to perform different matrix multiplication operations in a same computing cycle.

Optionally, the computing instruction is used to implement any matrix multiplication operation in the graph neural network.

Optionally, the computing core, including a first cache component, a second cache component, a matrix multiplication computing component, and an output component, the first cache component, configured to load data in a first matrix participating in a current matrix multiplication operation in a graph neural network from an external first memory according to a received computing instruction;

the second cache component, configured to load data in a second matrix participating in the current matrix multiplication operation from an external second memory according to the computing instruction;

the matrix multiplication computing component, configured to compute matrix multiplication results of N pieces of row data or N pieces of column data in the first matrix and N pieces of column data or N pieces of row data in the second matrix in parallel based on a parallel count N set in the computing instruction; and the output component, configured to temporarily store the matrix multiplication results, and write, in response to a data volume of the matrix multiplication results satisfying a preset write condition, the matrix multiplication results into the first memory or the second memory set in the computing instruction, and wherein a transmission bandwidth of the second memory is greater than that of the first memory; and in response to the matrix multiplication results needing to participate in computation in a traversal manner when participating in each round of computation in a next matrix multiplication operation, the computing instruction is set with the second memory; or in response to the matrix multiplication results having no need to participate in computation in a traversal manner when participating in each round of computation in a next matrix multiplication operation, the computing instruction is set with the first memory.

Optionally, the first cache component is configured to load remaining unloaded data in the first matrix participating in the current matrix multiplication operation from the first memory during computation of the matrix multiplication results by the matrix multiplication computing component; and correspondingly, the second cache component is configured to load remaining unloaded data in the second matrix participating in the current matrix multiplication operation from the second memory during computation of the matrix multiplication results by the matrix multiplication computing component.

Optionally, the first cache component loads the data in the first matrix in a ping-pong mode.

Optionally, the second cache component loads the data in the second matrix using a first in first out queue.

Optionally, the matrix multiplication computing component includes at least one computing unit, and the computing unit includes a multiplier and an accumulator, with a data volume per computation equal to N.

In a third aspect, the present disclosure provides a computing method, including:

generating a computing instruction for each matrix multiplication operation in a graph neural network, and wherein a parallel count N and a write location of a matrix multiplication result of the corresponding matrix multiplication operation are set in the computing instruction; and sending the computing instruction to the above accelerator, so that the accelerator performs accelerated computing on the graph neural network.

Optionally, the sending the computing instruction to the above accelerator includes:

sending the corresponding computing instruction in sequence to the accelerator according to a computing sequence of different matrix multiplication operations in the graph neural network.

Optionally, further including:

determining a value of the parallel count N based on a resource configuration of the computing core in the accelerator.

Optionally, the determining a value of the parallel count N based on a resource configuration of the computing core in the accelerator includes:

constructing a constraint formula based on the resource configuration of the computing core: $Count \geq N3/2$, and $BW \geq DW \times f \times N2$, and wherein Count represents a computing resource count of the computing core, BW represents a memory access bandwidth of the computing core, DW represents a data bit width of the computing core, and f represents a computing clock frequency of the computing core; and determining the value of N based on the constraint formula.

In a fourth aspect, the present disclosure provides a computing apparatus, including:

a generation module, configured to generate a computing instruction for each matrix multiplication operation in a graph neural network, and wherein a parallel count N and a write location of a matrix multiplication result of the corresponding matrix multiplication operation are set in the computing instruction; and a sending module, configured to send the computing instruction to the above accelerator, so that the accelerator performs accelerated computing on the graph neural network.

Optionally, the sending module is configured to:

send the corresponding computing instruction in sequence to the accelerator according to a computing sequence of different matrix multiplication operations in the graph neural network.

Optionally, further includes:

a configuration module, configured to determine a value of the parallel count N based on a resource configuration of the computing core in the accelerator.

Optionally, the configuration module is configured to:

construct a constraint formula based on the resource configuration of the computing core: Count≥N3/2, and BW≥DW×f×N2, and wherein Count represents a computing resource count of the computing core, BW represents a memory access bandwidth of the computing core, DW represents a data bit width of the computing core, and f represents a computing clock frequency of the computing core; and determine the value of N based on the constraint formula.

In a fifth aspect, the present disclosure provides an electronic device, including:

a memory, configured to store a computer program; and a processor, configured to execute the computer program to implement the above computing method.

In a sixth aspect, the present disclosure provides a non-transitory readable storage medium, configured to store a computer program, wherein when the computer program is executed by a processor, the above computing method is implemented.

In a seventh aspect, the present disclosure provides a computing system, including a server and at least one the above accelerator.

Through the above solution, the present application provides a computing core, including a first cache component, a second cache component, a matrix multiplication computing component, and an output component, the first cache component is configured to load data in a first matrix participating in a current matrix multiplication operation in a graph neural network from an external first memory according to a received computing instruction; the second cache component is configured to load data in a second matrix participating in the current matrix multiplication operation from an external second memory according to the computing instruction; the matrix multiplication computing component is configured to compute matrix multiplication results of N pieces of row data or N pieces of column data in the first matrix and N pieces of column data or N pieces of row data in the second matrix in parallel based on a parallel count N set in the computing instruction; and the output component is configured to temporarily store the matrix multiplication results, and write, in response to a data volume of the matrix multiplication results satisfying a preset write condition, the matrix multiplication results into the first memory or the second memory set in the computing instruction, wherein a transmission bandwidth of the second memory is greater than that of the first memory; and in response to the matrix multiplication results needing to participate in computation in a traversal manner participating in each round of computation in a next matrix multiplication operation, the computing instruction is set with the second memory; or in response to the matrix multiplication results having no need to participate in computation in a traversal manner participating in each round of computation in a next matrix multiplication operation, the computing instruction is set with the first memory.

It may be learned that the computing core provided in the present disclosure may compute the matrix multiplication results of the N pieces of row data or the N pieces of column data in the first matrix and the N pieces of column data or the N pieces of row data in the second matrix in parallel, so that N final matrix multiplication results may be obtained at one time, improving computing efficiency and speed; and the computing core does not need to temporarily store intermediate results, saving on-chip resources. After the matrix multiplication result is obtained, according to the present disclosure, which memory to store the matrix multiplication result may be determined based on a participation method used when the matrix multiplication result participates in each round of computation in the next matrix multiplication operation. Optionally, when the matrix multiplication result needs to participate in computation in the traversal manner when participating in each round of computation in the next matrix multiplication operation, the matrix multiplication result is stored in the second memory; or when the matrix multiplication result does not need to participate in computation in the traversal manner when participating in each round of computation in the next matrix multiplication operation, the matrix multiplication result is stored in the first memory. This may implement consistency between a storage format of the matrix multiplication result in the memory and an output format of the matrix multiplication result used when the matrix multiplication result participates in computation, facilitating sequential reading of data during continuous computation without matrix transposition. Therefore, memory access time overheads may be reduced, and efficiency may be improved. The matrix multiplication result is written only when the preset write condition is satisfied, so that a write count may be reduced, and write efficiency and bandwidth utilization may be improved.

Correspondingly, the accelerator, the computing method and apparatus, the device, the non-transitory readable storage medium, and the system provided in the present disclosure also have the above technical effects.

BRIEF DESCRIPTION OF THE DRAWINGS

In order to describe technical solutions of the embodiments of the present disclosure more clearly, the accompanying drawings used in the illustration of the embodiments will be briefly introduced. Apparently, the accompanying drawings in the following explanation illustrate merely some embodiments of the present disclosure, and those skilled in the art may obtain other accompanying drawings based on these accompanying drawings without paying any creative effort.

FIG. 9 is a schematic diagram of continuous storage of written data according to the present disclosure;

FIG. 10 is a schematic diagram of a matrix multiplication calculation procedure according to the present disclosure.

DETAILED DESCRIPTION

A clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

Currently, an existing computing component may perform a matrix multiplication operation through a matrix partitioning operation. However, in this manner, a large quantity of intermediate results need to be temporarily stored outside the computing component. When performing subsequent computation, the computing component reads the intermediate results back to a chip for accumulation, which causes many additional data movement operations, wastes computing resources, and reduces a computing speed. Therefore, the present disclosure provides a solution that may improve a computing speed and computing efficiency of the matrix multiplication operation in a graph neural network.

Figure 1:
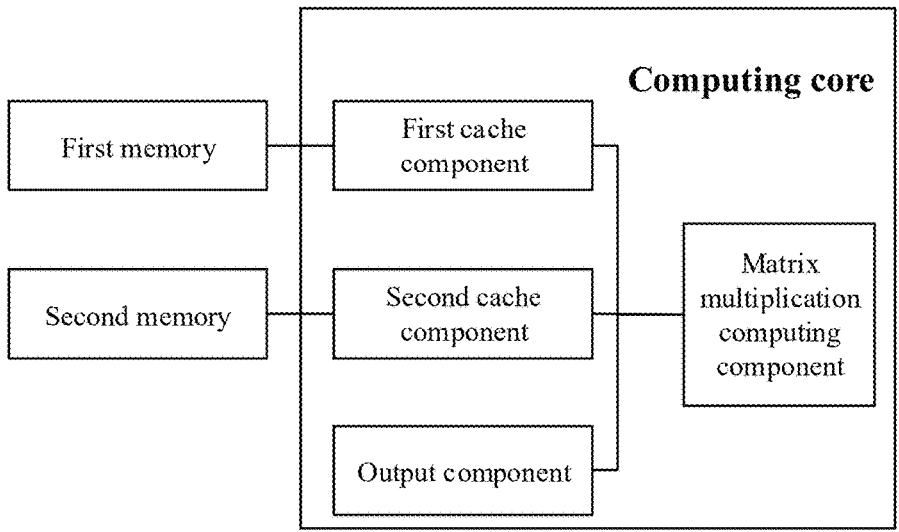
FIG. 1 is a schematic diagram of a computing core according to the present disclosure.

Refer to FIG. 1. An embodiment of the present disclosure discloses a computing core, including a first cache component, a second cache component, a matrix multiplication computing component, and an output component.

The first cache component is configured to load data in a first matrix participating in a current matrix multiplication operation in a graph neural network from an external first memory according to a received computing instruction. The second cache component is configured to load data in a second matrix participating in the current matrix multiplication operation from an external second memory according to the computing instruction. The matrix multiplication computing component is configured to compute matrix multiplication results of N pieces of row data or N pieces of column data in the first matrix and N pieces of column data or N pieces of row data in the second matrix in parallel based on a parallel count N set in the computing instruction. The output component is configured to temporarily store the matrix multiplication results, and write, in response to a data volume of the matrix multiplication results satisfying a preset write condition, the matrix multiplication results into the first memory or the second memory set in the computing instruction. A piece of row data is a row of data in the matrix. A piece of column data is a column of data in the matrix.

A transmission bandwidth of the second memory (for example, a high bandwidth memory (HBM)) is greater than that of the first memory (for example, a double data rate (DDR)). In response to the matrix multiplication results needing to participate in computation in a traversal manner when participating in each round of computation in a next matrix multiplication operation, the computing instruction is set with the second memory; or in response to the matrix multiplication results having no need to participate in computation in a traversal manner when participating in each round of computation in a next matrix multiplication operation, the computing instruction is set with the first memory. The HBM is a central processing unit (CPU)/graphics processing unit (GPU) memory chip supporting a high bandwidth. Compared with the HBM, the DDR supports a lower bandwidth.

The computing instruction is used to implement any matrix multiplication operation in the graph neural network. A value of the parallel count N is determined based on a resource configuration of the computing core. Optionally, a constraint formula is constructed based on the resource configuration of the computing core: Count≥N3/2, and BW≥DW×f×N2, wherein Count represents a computing resource count of the computing core, BW represents a memory access bandwidth of the computing core, DW represents a data bit width of the computing core, and f represents a computing clock frequency of the computing core. The value of N is determined based on the constraint formula.

In an optional implementation, the first cache component is configured to load remaining unloaded data in the first matrix participating in the current matrix multiplication operation from the first memory during computation of the matrix multiplication results by the matrix multiplication computing component. Correspondingly, the second cache component is configured to load remaining unloaded data in the second matrix participating in the current matrix multiplication operation from the second memory during computation of the matrix multiplication results by the matrix multiplication computing component. In this way, data may be loaded in advance without waiting for completion of a previous operation, and the computing component may keep performing data computation without an idle state, improving computing resource utilization and system computing efficiency and reducing a task delay.

In an optional implementation, the first cache component loads the data in the first matrix in a ping-pong mode. The first cache component may be an ultra random access memory (URAM).

In an optional implementation, the second cache component loads the data in the second matrix using a first in first out queue. Optionally, the second cache component caches the data in the second matrix using a first first in first out queue, and caches the matrix multiplication results using a second first in first out queue.

Figure 2:
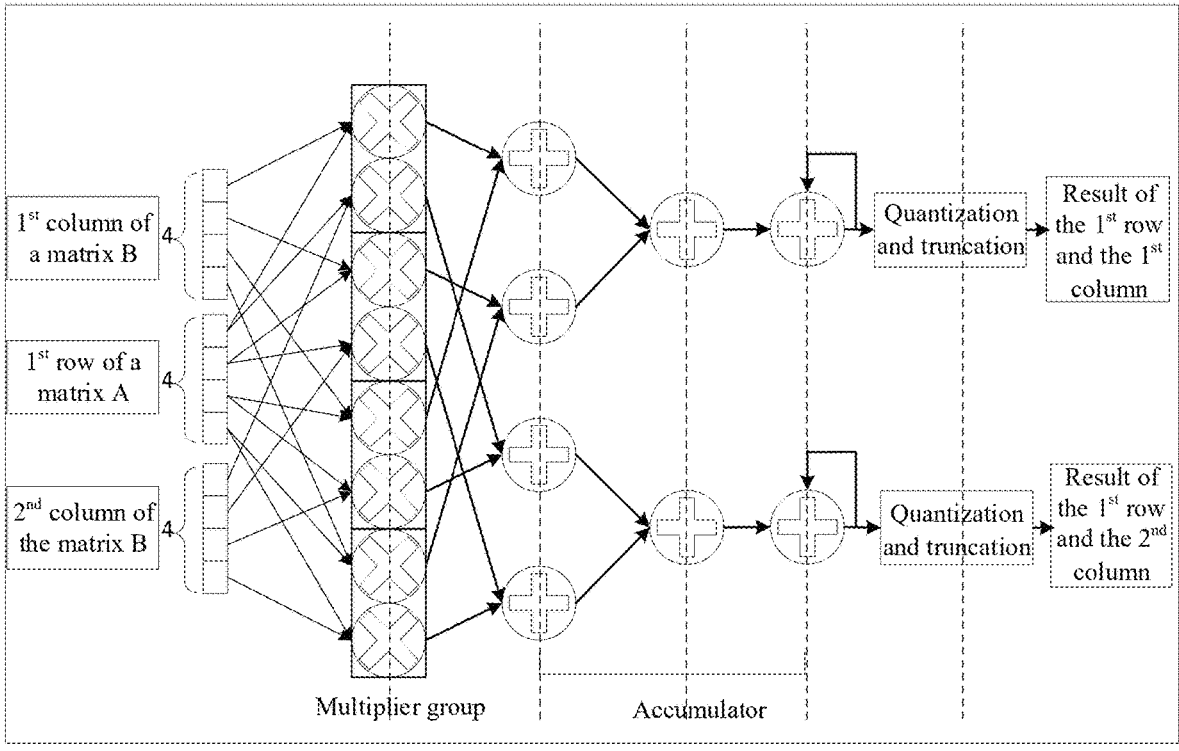
FIG. 2 is a schematic diagram of a structure of a computing unit according to the present disclosure.

In an optional implementation, the matrix multiplication computing component includes at least one computing unit, wherein the computing unit includes a multiplier and an accumulator, with a data volume per computation equal to N. Refer to FIG. 2. Any computing unit may include at least one multiplier group, wherein one multiplier group includes two multipliers. In addition, an output of one multiplier group is connected to the accumulator. As shown in FIG. 2, the data volume per computation is 4, so that there are four multiplier groups. If necessary, the multiplier groups and the accumulator connected to outputs of the multiplier groups may be flexibly added or deleted. This may implement flexible scaling and adjustment of the computing component. Quantization and truncation in FIG. 2 is used to implement quantization and truncation of the data bit width. If the data bit width is 8, a bit width of the multiplication result is 16, and after accumulation, the data bit width increases. In this case, a data bit width of a final result needs to be truncated to eight bits.

The data volume per computation is: N=a row parallel count=a column parallel count, so that storage formats of row/column matrices participating in computation in a memory may be consistent, facilitating row-major/column-major transfer (left-right matrix) transformation of a computation result in each step in the graph neural network. Therefore, the memory may be accessed sequentially during continuous computation.

The computing core provided in this embodiment may compute the matrix multiplication results of the N pieces of row data or the N pieces of column data in the first matrix and the N pieces of column data or the N pieces of row data in the second matrix in parallel, so that N final matrix multiplication results may be obtained at one time, improving computing efficiency and speed; and the computing core does not need to temporarily store intermediate results, saving on-chip resources.

According to the present disclosure, after the matrix multiplication result is obtained, which memory to store the matrix multiplication result may be determined based on a participation method used when the matrix multiplication result participates in each round of computation in the next matrix multiplication operation. Optionally, when the matrix multiplication result needs to participate in computation in the traversal manner when participating in each round of computation in the next matrix multiplication operation, the matrix multiplication result is stored in the second memory; or when the matrix multiplication result does not need to participate in computation in the traversal manner when participating in each round of computation in the next matrix multiplication operation, the matrix multiplication result is stored in the first memory. This may implement consistency between a storage format of the matrix multiplication result in the memory and an output format of the matrix multiplication result used when the matrix multiplication result participates in computation, facilitating sequential reading of data during continuous computation without matrix transposition. Therefore, memory access time overheads may be reduced, and efficiency may be improved. The matrix multiplication result is written only when the preset write condition is satisfied, so that a write count may be reduced, and write efficiency and bandwidth utilization may be improved. It may be learned that according to this embodiment, the computing speed and the computing efficiency of the matrix multiplication operation in the graph neural network may be improved.

The following describes an accelerator provided in the embodiments of the present disclosure. The accelerator described below and the computing core described above may be referenced mutually.

An embodiment of the present disclosure discloses an accelerator, including a controller, a first memory, a second memory whose transmission bandwidth is greater than that of the first memory, and the above computing core.

The controller is respectively connected to the first memory, the second memory, and the computing core. The computing core is respectively connected to the first memory and the second memory. The controller is configured to send a computing instruction for a matrix multiplication operation in a graph neural network to the first memory, the second memory, and the computing core. The first memory is configured to obtain and store, in a direct memory access (DMA) mode according to the computing instruction, a first matrix participating in a current matrix multiplication operation. The second memory is configured to obtain and store, in the DMA mode according to the computing instruction, a second matrix participating in the current matrix multiplication operation. The computing core is configured to compute a matrix multiplication result of the first matrix and the second matrix according to the computing instruction.

A transmission bandwidth of the second memory (for example, an HBM) is greater than that of the first memory (for example, a DDR), and a matrix participating in computation in a traversal manner is stored in the second memory, so that the matrix participating in computation in the traversal manner may be read faster, and a computing speed may be improved.

The computing core includes the first cache component, the second cache component, the matrix multiplication computing component, and the output component. The first cache component may load remaining unloaded data in the first matrix participating in the current matrix multiplication operation from the first memory during computation of the matrix multiplication result by the matrix multiplication computing component. Correspondingly, the second cache component may load remaining unloaded data in the second matrix participating in the current matrix multiplication operation from the second memory during computation of the matrix multiplication result by the matrix multiplication computing component. In this way, data may be loaded in advance without waiting for completion of a previous operation, and the computing component may keep performing data computation without an idle state, improving computing resource utilization and system computing efficiency and reducing a task delay.

Figure 3:
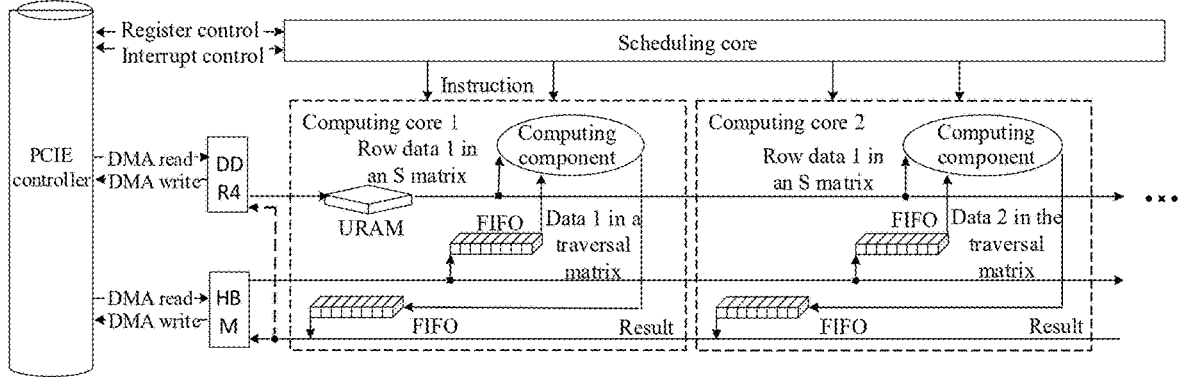
FIG. 3 is a schematic diagram of a structure of an accelerator according to the present disclosure.

Refer to FIG. 3. A plurality of computing cores may be provided in the accelerator. Correspondingly, a scheduling core needs to be provided to enable the controller to schedule and control these computing cores.

In an optional implementation, the controller is further configured to control the plurality of computing cores to perform a same matrix multiplication operation. In an optional implementation, the controller is configured to: when controlling the plurality of computing cores to perform the same matrix multiplication operation, cause each computing core to compute a matrix multiplication result of a same row of data or a same column of data in the first matrix and a different column of data or a different row of data in the second matrix in a same computing cycle. For example, in the same computing cycle (a same time period), a computing core 1 computes a multiplication result of the $1^{st}$ row in the first matrix and the $1^{st}$ column in the second matrix, and a computing core 2 computes a multiplication result of the $1^{st}$ row in the first matrix and the $2^{nd}$ column in the second matrix. This may implement reuse of the $1^{st}$ row of data in the first matrix on the plurality of computing cores, avoiding repeated reading of data and improving computing efficiency. As shown in FIG. 3, row data 1 (the $1^{st}$ row of data) in an S matrix is reused by the computing core 1 and the computing core 2.

Figure 4:
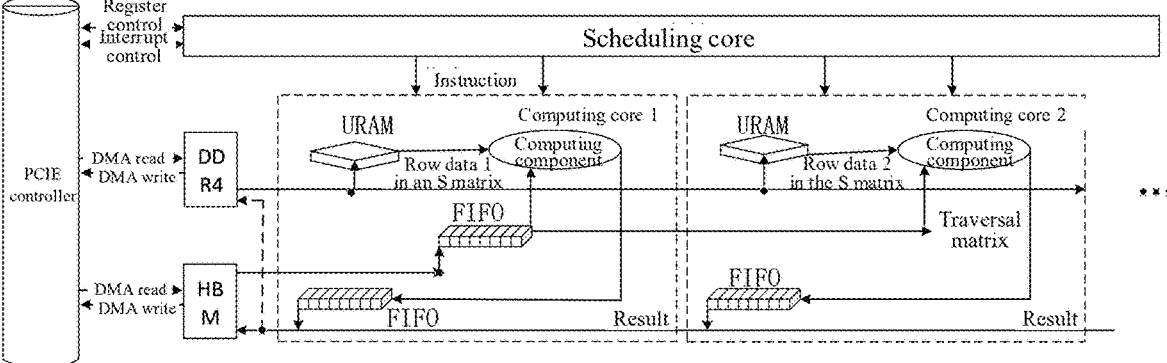
FIG. 4 is a schematic diagram of a structure of another accelerator according to the present disclosure.

In an optional implementation, the controller is configured to: when controlling the plurality of computing cores to perform the same matrix multiplication operation, cause each computing core to compute a matrix multiplication result of a different column of data or a different row of data in the first matrix and a same column of data or a same row of data in the second matrix in a same computing cycle. For example, in the same computing cycle (a same time period), a computing core 1 computes a multiplication result of the $1^{st}$ row in the first matrix and the $1^{st}$ column in the second matrix, and a computing core 2 computes a multiplication result of the $2^{nd}$ row in the first matrix and the $1^{st}$ column in the second matrix. This may implement reuse of $1^{st}$ column of data in the second matrix on the plurality of computing cores, avoiding repeated reading of data and improving computing efficiency. As shown in FIG. 4, a traversal matrix is reused by the computing core 1 and the computing core 2.

Figure 5:
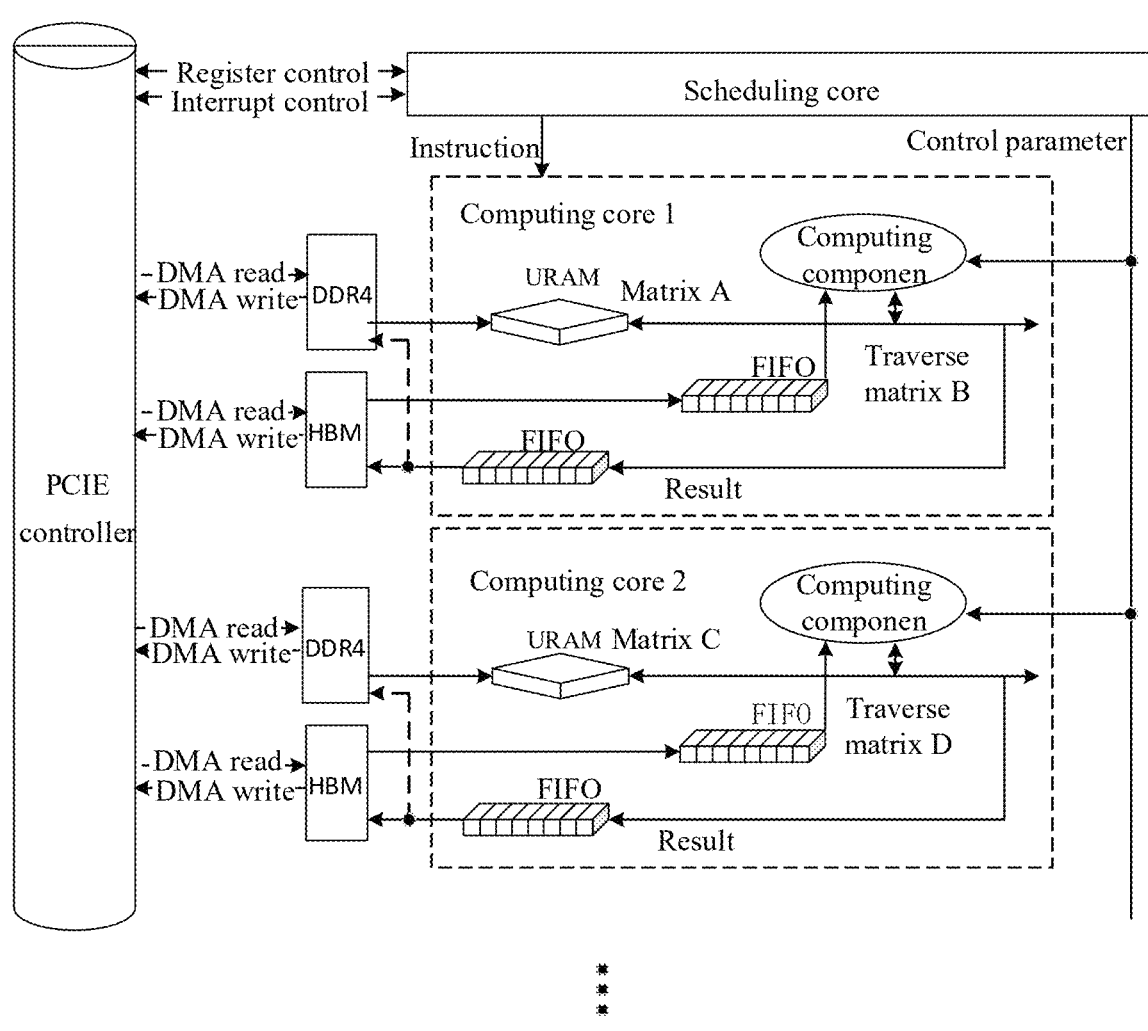
FIG. 5 is a schematic diagram of a structure of a third accelerator according to the present disclosure.

In an optional implementation, the controller is further configured to control different computing cores to perform different matrix multiplication operations in a same computing cycle. For example, in the same computing cycle (a same time period), a computing core 1 computes a multiplication result of the $1^{st}$ row in the first matrix and the $1^{st}$ column in the second matrix, and a computing core 2 computes a multiplication result of the $1^{st}$ row in a third matrix and the $1^{st}$ column in a fourth matrix. This may implement concurrent execution of a matrix multiplication operation on the first matrix and the second matrix and a matrix multiplication operation on the third matrix and the fourth matrix, improving computing efficiency. As shown in FIG. 5, the computing core 1 computes a multiplication result of a matrix A and a matrix B, and the computing core 2 computes a multiplication result of a matrix C and a matrix D.

Since data in the entire traversal matrix needs to be continuously traversed, the high-bandwidth HBM may be used to cache the data in the traversal matrix. A single-port low-bandwidth DDR4 is used to buffer a few rows/columns of data in the S matrix. In addition to providing reasonable bandwidths for the traversal matrix and the S matrix respectively, using the high-bandwidth memory and the low-bandwidth memory may hide memory access time overheads and improve overall system throughput efficiency because subsequent data may be continuously loaded during computation. As shown in FIG. 3, the data in the S matrix may be reused only by loading a few rows/columns of data in the S matrix into an on-chip cache and then loading the traversal matrix in a first in first out (FIFO) streaming manner. In other words, the data in the S matrix is shared by the plurality of computing cores, so that the data may be written back in sequence based on a data memory organization format, and an access conflict of a shared external memory interface may be avoided.

In an optional implementation, the computing instruction is used to implement any matrix multiplication operation in the graph neural network. A main operation in the graph neural network is multiplying a feature matrix F by a corresponding wavelet matrix Wav and weight matrix W, which is represented by the following formula: Wav×(F×W). As shown in the formula, when the feature matrix F is multiplied by W, F is a left matrix on the left side of the multiplication sign, and when a product of F×W is multiplied by Wav, the product is a right matrix on the right side of the multiplication sign. Such a location change requires determining, in advance according to a location of the product in a next multiplication operation, whether row-major storage or column-major storage is used for the product of F×W. When a previous matrix multiplication result needs to be stored as a row-major matrix for next computation, in a previous matrix multiplication process, all columns of the right matrix are traversed with N rows of data in the left matrix remaining unchanged, to obtain results of multiplying the N rows by all the columns, and then results of multiplying rows N+1 to 2N by all the columns are computed, until computation is complete. In this process, row data of the left matrix is reused while the row-major matrix is generated in sequence. When a previous matrix multiplication result needs to be stored as a column-major matrix for next computation, in a previous matrix multiplication process, all rows of the left matrix are traversed with N columns of data in the right matrix remaining unchanged, to obtain results of multiplying the N columns by all the rows, and then results of multiplying columns N+1 to 2N by all the rows are computed, until computation is complete. In this process, column data of the right matrix is reused while the column-major matrix is generated in sequence.

Any computing core includes a first cache component, a second cache component, a matrix multiplication computing component, and an output component. The matrix multiplication computing component includes at least one computing unit, wherein the computing unit includes a multiplier and an accumulator, with a data volume per computation equal to N. The data volume per computation is: N=a row parallel count=a column parallel count, so that storage formats of row/column matrices participating in computation in a memory may be consistent, facilitating row-major/column-major transfer (left-right matrix) transformation of a computation result in each step in the graph neural network. Therefore, the memory may be accessed sequentially during continuous computation. A computing speedup may be adjusted by flexibly setting a value of N. Optionally, the value of the parallel count N is determined based on a resource configuration of the computing core. For example, a constraint formula is constructed based on the resource configuration of the computing core: Count≥N3/2, and BW≥DW×f×N2, wherein Count represents a computing resource count of the computing core, BW represents a memory access bandwidth of the computing core, DW represents a data bit width of the computing core, and f represents a computing clock frequency of the computing core. The value of N is determined based on the constraint formula.

It can be learned that this embodiment provides the accelerator. With the accelerator, memory access and time overheads of matrix transposition can be avoided, data reuse during computation may be implemented, the computing speed and the computing efficiency of the matrix multiplication operation in the graph neural network may be improved, and flexible parallel scaling of the computing component may be implemented.

The following describes a computing method provided in the embodiments of the present disclosure. The computing method described below and the other embodiments can be referenced mutually.

Figure 6:
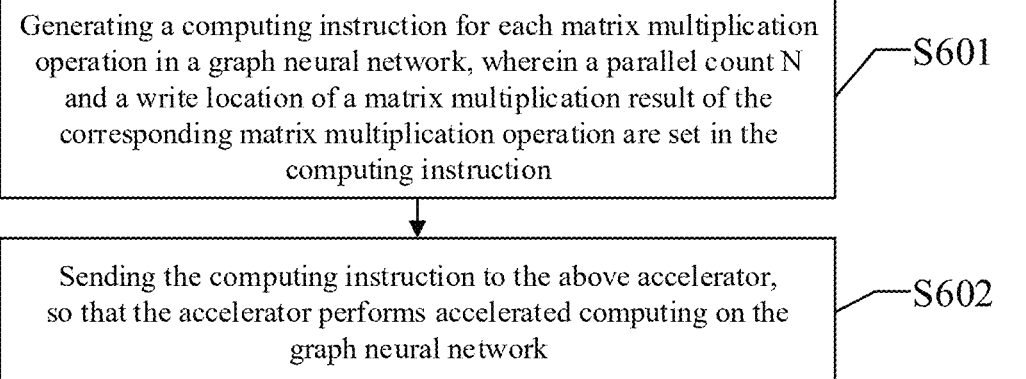
FIG. 6 is a flow chart of a computing method according to the present disclosure.

Refer to FIG. 6. An embodiment of the present disclosure discloses a computing method, including the following steps.

S601, generating a computing instruction for each matrix multiplication operation in a graph neural network, wherein a parallel count N and a write location of a matrix multiplication result of the corresponding matrix multiplication operation are set in the computing instruction.

S602, sending the computing instruction to the above accelerator, so that the accelerator performs accelerated computing on the graph neural network.

There are many nodes in the graph neural network, wherein each node corresponds to a feature matrix. A feature matrix F is multiplied by a corresponding wavelet matrix Wav and weight matrix W, which is represented by the following formula: wav×(F×W). The graph neural network includes a plurality of such multiplication steps. Therefore, a sequence of corresponding computing instructions needs to be determined based on a computing order of different matrix multiplication operations in the graph neural network, and then the computing instructions are sent in sequence to the accelerator, to cause the accelerator to perform the matrix multiplication operations in the graph neural network in sequence. In an optional implementation, the sending the computing instruction to the above accelerator includes: sending the corresponding computing instructions in sequence to the accelerator according to a computing sequence of different matrix multiplication operations in the graph neural network.

In an optional implementation, a value of the parallel count N is determined based on a resource configuration of the computing core in the accelerator. In an optional implementation, determining the value of the parallel count N based on the resource configuration of the computing core in the accelerator includes: constructing a constraint formula based on the resource configuration of the computing core:

Count≥N3/2, and BW≥DW×f×N2, wherein Count repre-
sents a computing resource count of the computing core,
BW represents a memory access bandwidth of the comput-
ing core, DW represents a data bit width of the computing
core, and f represents a computing clock frequency of the
computing core; and determining the value of N based on the
constraint formula. Optionally, a maximum value of N that
satisfies Count≥N3/2 and BW≥DW×f×N2 is obtained
through solving as the parallel count.

It can be learned that this embodiment provides the
computing method. Memory access and time overheads of
matrix transposition may be avoided, data reuse during
computation may be implemented, a computing speed and
computing efficiency of the matrix multiplication operation
in the graph neural network may be improved, and flexible
parallel scaling of the computing component may be imple-
mented.

The following describes a computing apparatus provided
in the embodiments of the present disclosure. The comput-
ing apparatus described below and the other embodiments m
be referenced mutually.

An embodiment of the present disclosure discloses a
computing apparatus, including:
  a generation module, configured to generate a computing
    instruction for each matrix multiplication operation in
    a graph neural network, wherein a parallel count N and
    a write location of a matrix multiplication result of the
    corresponding matrix multiplication operation are set
    in the computing instruction; and
  a sending module, configured to send the computing
    instruction to the above accelerator, so that the accel-
    erator performs accelerated computing on the graph
    neural network.

In an optional implementation, the sending module is
configured to:
  send corresponding computing instructions in sequence to
    the accelerator according to a computing sequence of
    different matrix multiplication operations in the graph
    neural network.

In an optional implementation, the apparatus further
includes:
  a configuration module, configured to determine a value
    of the parallel count N based on a resource configura-
    tion of the computing core in the accelerator.

In an optional implementation, the configuration module
is configured to:
  construct a constraint formula based on the resource
    configuration of the computing core: Count≥N3/2, and
    BW≥DW×f×N2, wherein Count represents a comput-
    ing resource count of the computing core, BW repre-
    sents a memory access bandwidth of the computing
    core, DW represents a data bit width of the computing
    core, and f represents a computing clock frequency of
    the computing core; and
  determine the value of N based on the constraint formula.

For a more detailed working process of each module and
unit in this embodiment, refer to corresponding content
disclosed in the other embodiments, and details are not
described herein again.

It can be learned that this embodiment provides the
computing apparatus. Memory access and time overheads of
matrix transposition may be avoided, data reuse during
computation may be implemented, a computing speed and
computing efficiency of the matrix multiplication operation
in the graph neural network may be improved, and flexible
parallel scaling of the computing component may be imple-
mented.

Figure 7:
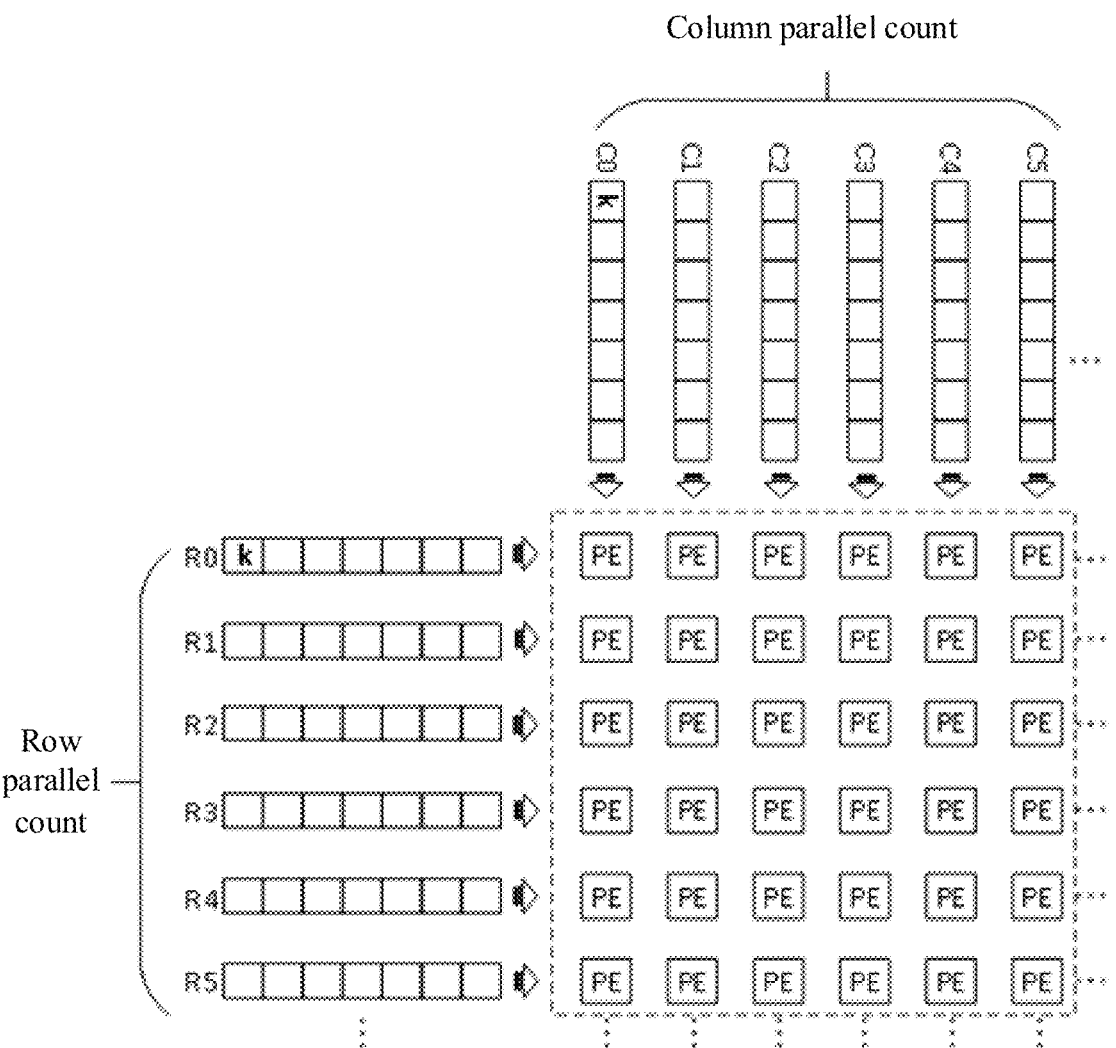
FIG. 7 is a schematic diagram of parallel data input according to the present disclosure.

Based on any one of the above embodiments, the follow-
ing provides a design solution of the computing component
for the matrix multiplication operation in the graph neural
network. As shown in FIG. 7, a process element (PE) (a
computing unit) array constituting the computing compo-
nent is designed using three parameters: a kernel length, a
row parallel count R, and a column parallel count C, wherein
the kernel length=the row parallel count R=the column
parallel count C. In FIG. 7, one row of data or one column
of data in a matrix is divided into seven data blocks of a size
K. The PE array shown in FIG. 7 may perform computation
on data input into the PE array. To be specific, when the
kernel length=the row parallel count R=the column parallel
count C=8, eight rows of data and eight columns of data are
concurrently input into the PE array, so that the PE array
concurrently computes multiplication results of the eight
rows of data and the eight columns of data. It should be
noted that the seven data blocks of the size K shown in FIG.
7 are merely an example. During actual implementation, the
quantity of data blocks should be an exponent of 2, that is,
one row of data or one column of data is divided into data
blocks of the size K whose quantity is the exponent of 2.

In this embodiment, the kernel length, the row parallel
count R, and the column parallel count C are set based on a
digital signal processor (DSP) resource and a memory
access bandwidth of a single PE. A used DSP count is:
countDSP=K*R*(C/2), wherein K is the kernel length, R is
the row parallel count, and C is the column parallel count.
The memory access bandwidth is:
BWtraverse=DW*K*C*f, wherein DW is a bit width of
each piece of data, K is the kernel length, C is the column
parallel count, and f is an operating clock frequency of a
DSP. For example, when the data is int8, K=C=16, and f is
400 M/s, BWtraverse=8 bit*16*16*400 M/s=100 GB/s.
Therefore, the value of the parallel count may be deter-
mined. Since the kernel length=the row parallel count R=the
column parallel count C, during actual implementation, the
above formula may be replaced with Count≥N3/2 and
BW≥DW×f×N2, wherein N=K=R=C.

In this embodiment, kernel is a smallest unit participating
in computation. A single PE use a multiplier-accumulator
structure, and this structure has the advantage of capability
in accelerating computing processes in parallel. If a length
of a row is L, time for sequential computation for an entire
row/column is L. If the structure shown in FIG. 2 is used, the
time is log 2(L).

Figure 8:
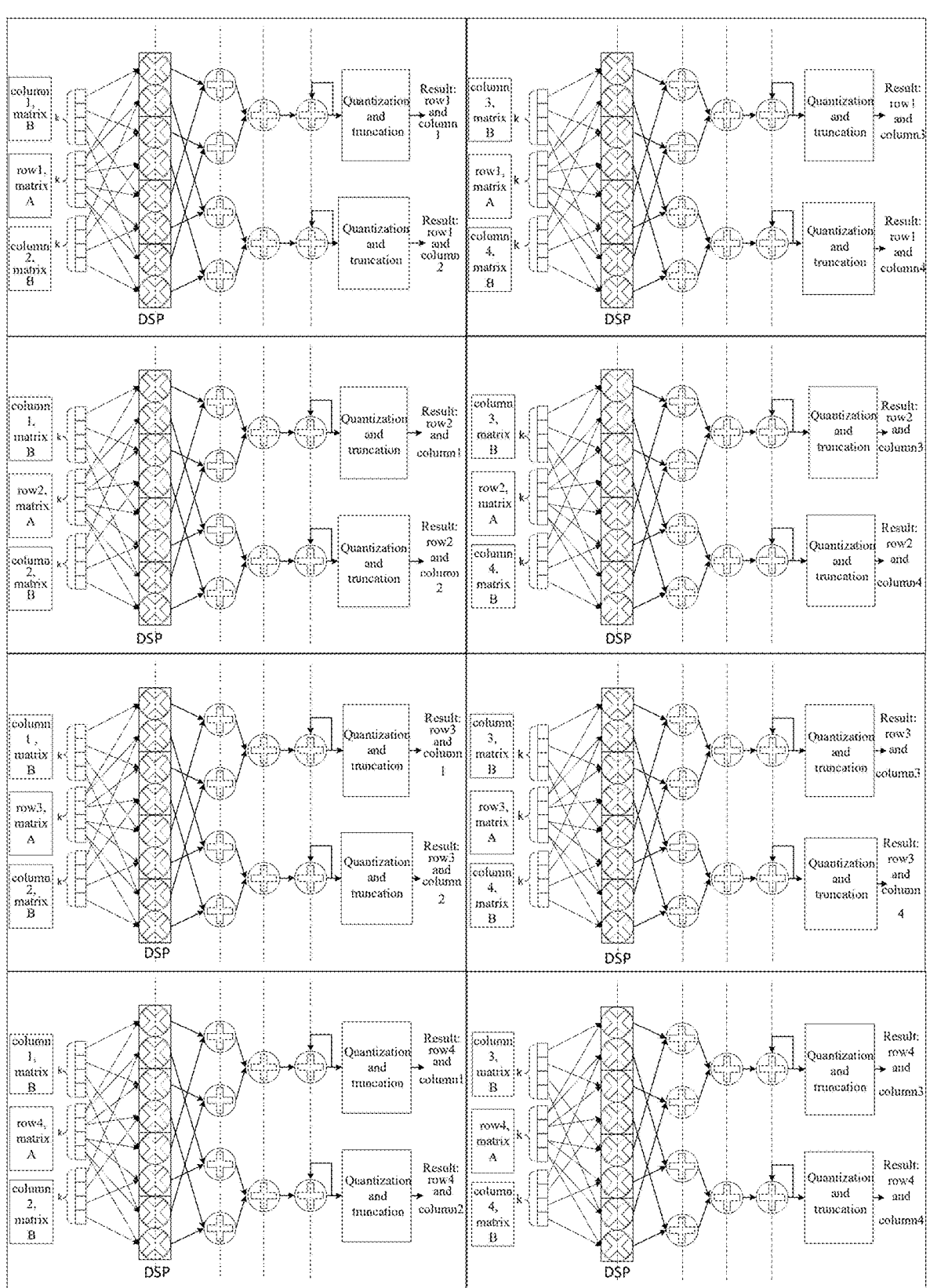
FIG. 8 is a schematic diagram of a 4*4*4 PE array according to the present disclosure.

In an example, a 4*4*4 PE array is shown in FIG. 8. In
FIG. 8, one set of data is reused in each PE.

The data volume per computation is: N=the row parallel
count=the column parallel count, so that storage formats of
row/column matrices participating in computation in a
memory may be consistent, facilitating row-major/column-
major transfer (left-right matrix) transformation of a com-
putation result in each step in the graph neural network.
Therefore, the memory may be accessed sequentially during
continuous computation. For example, during multiplication
of a matrix A with four rows and four columns by a matrix
B with four rows and N columns, when R=C=4, for the $1^{st}$
to $4^{th}$ rows of data in the matrix A and the $1^{st}$ to $4^{th}$ columns
of data in the matrix B, K pieces of data are extracted per
clock cycle, and after complete row/column traversal, the $1^{st}$
to $4^{th}$ rows and the $1^{st}$ to $4^{th}$ columns of data in a result matrix
are obtained. Then, the $5^{th}$ to $8^{th}$ columns of data in the
matrix B and the $1^{st}$ to $4^{th}$ rows of data in the matrix A are
traversed again to obtain the $1^{st}$ to $4^{th}$ rows and the $5^{th}$ to $8^{th}$
columns of data in the result matrix. This cycle is repeated
until computation for the $1^{st}$ to $4^{th}$ rows of data in the result matrix is completed. Then, traversal continues to be performed for the $5^{th}$ to $8^{th}$ rows of data in the matrix A. In this way, a data arrangement of the result matrix is consistent with that of the matrix A, ensuring consistency between input and output matrix formats during each matrix computation. This example is for row-major matrices, and the same logic applies to column-major matrices. Optionally, a storage sequence of the result matrix is shown in FIG. 9.

The computing core provided in this embodiment may compute the matrix multiplication results of the N pieces of row data or the N pieces of column data in the first matrix and the N pieces of column data or the N pieces of row data in the second matrix in parallel, so that N final matrix multiplication results may be obtained at one time, improving computing efficiency and speed; and the computing core does not need to temporarily store intermediate results, saving on-chip resources.

Refer to FIG. 10. A matrix multiplication operation procedure implemented according to this embodiment includes:

(1) executing a reused matrix loading instruction to read a set of row/column data of the stationary matrix (the S matrix, a reused matrix, that is, data of this matrix may be reused relative to the traversal matrix) from the DDR to the URAM, wherein a next set of data may be read in advance for ping-pong caching during computation for the current set because a storage depth of the URAM is usually large;

(2) executing a traversal matrix loading instruction to sequentially read all column/row data of the traversal matrix from the HBM to the FIFO;

(3) executing a matrix multiplication computing instruction, and performing computation by the PE array;

(4) after computation for a set of data is completed, executing a result write-back instruction, and writing results to a corresponding external HBM/DDR4 through bus burst transmission based on an address defined in the instruction; and (5) resetting accumulators in the PE array for next computation.

Steps (1) to (4) are repeated until computation for all sets of data in the S matrix is completed.

Writing the results to the corresponding external HBM/DDR4 through bus burst transmission may reduce a write count. To be specific, one adequate burst length indicates one write to an external memory. For example, if a current accelerator is an FPGA-based system, advanced extensible interface 4 (AXI4) (a bus protocol) used by the accelerator having a burst length of 4 KB, for an int8 data type, 4096 pieces of data need to be written to the local memory at a time.

It can be learned that in this embodiment, a quantitative design method is used to obtain an organization form and scale of the PE array based on on-chip resources and the memory access bandwidth that may be provided externally. A row/column-major matrix generation method is used to generate a feature matrix in a format required for a next-step computation in the graph neural network. A complete hardware acceleration system and method are used to perform data loading, traversal computation, and result write-back. A flexibly scalable multi-PE array architecture is used to accelerate parallel computation for one or more matrix multiplications. An operation instruction is split into the data loading instruction, the computing instruction, and the result write-back instruction, and data loading is performed in advance, ensuring continuous operation of the PE array. This solution may flexibly adapt to hardware resources, implement periodic pipelining of instructions, effectively improve the computing and memory access efficiency, and complete flexible transformation and continuous efficient computation for each level of matrix in the graph neural network.

The following describes an electronic device provided in the embodiments of the present disclosure. The electronic device described below and the other embodiments may be referenced mutually.

Figure 11:
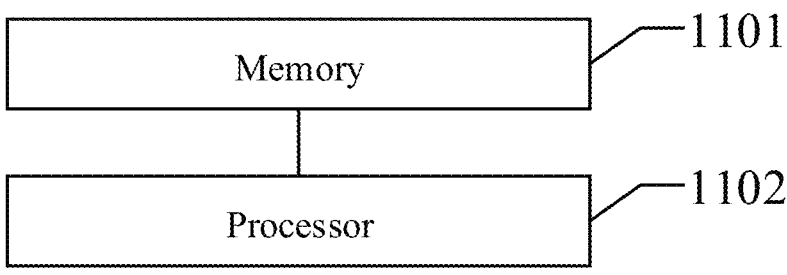
FIG. 11 is a schematic diagram of an electronic device according to the present disclosure.

Refer to FIG. 11. An embodiment of the present disclosure discloses an electronic device, including:

a memory 1101, configured to store a computer program; and a processor 1102, configured to execute the computer program to implement the method disclosed in any one of the above embodiments.

In this embodiment, when the processor executes the computer program stored in the memory, the following steps may be implemented: generating a computing instruction for each matrix multiplication operation in a graph neural network, wherein a parallel count N and a write location of a matrix multiplication result of the corresponding matrix multiplication operation are set in the computing instruction; and sending the computing instruction to the above accelerator, so that the accelerator performs accelerated computing on the graph neural network.

In this embodiment, when the processor executes the computer program stored in the memory, the following step may be implemented: sending corresponding computing instructions in sequence to the accelerator according to a computing sequence of different matrix multiplication operations in the graph neural network.

In this embodiment, when the processor executes the computer program stored in the memory, the following step may be implemented: determining a value of the parallel count N based on a resource configuration of the computing core in the accelerator.

In this embodiment, when the processor executes the computer program stored in the memory, the following steps may be implemented: constructing a constraint formula based on the resource configuration of the computing core: $Count \geq N3/2$, and $BW \geq DW \times f \times N2$, wherein Count represents a computing resource count of the computing core, BW represents a memory access bandwidth of the computing core, DW represents a data bit width of the computing core, and f represents a computing clock frequency of the computing core; and determining the value of N based on the constraint formula.

Optionally, an embodiment of the present disclosure further provides a server as the above electronic device. The server may include at least one processor, at least one memory, a power supply, a communication interface, an input/output interface, and a communication bus. The memory is configured to store a computer program. The computer program is loaded and executed by the processor to implement relevant steps in the computing method disclosed in any one of the above embodiments.

In this embodiment, the power supply is configured to provide an operating voltage for each hardware device on the server. The communication interface may create a data transmission channel between the server and an external device, and a communication protocol followed by the communication interface is any communication protocol that may be applied to the technical solutions of the present disclosure, which is not limited herein. The input/output interface is configured to obtain external input data or output data to the outside, and an interface type of the input/output interface may be selected according to an application requirement, which is not limited herein.

In addition, as a carrier for resource storage, the memory may be a read-only memory, a random access memory, a magnetic disk, an optical disk, or the like. A resource stored on the memory includes an operating system, the computer program, data, and the like. A storage manner may be temporary storage or permanent storage.

The operating system is configured to manage and control each hardware device and the computer program on the server, to implement operation and processing for data in the memory by the processor, and may be Windows Server, Netware, Unix, Linux, or the like. In addition to a computer program that may be configured to complete the computing method disclosed in any one of the above embodiments, the computer program may further include a computer program that may be configured to complete other specific tasks. In addition to data such as a virtual machine, the data may further include data such as a developer information of the virtual machine.

Optionally, an embodiment of the present disclosure further provides a terminal as the above electronic device. The terminal may include, but is not limited to, a smartphone, a tablet computer, a laptop computer, a desktop computer, or the like.

Generally, the terminal in this embodiment includes a processor and a memory.

The processor may include one or more processing cores, such as a four-core processor and an eight-core processor. The processor may be implemented in at least one hardware form of a DSP, a field programmable gate array (FPGA), and a programmable logic array (PLA). The processor may include a main processor and a co-processor. The main processor is a processor configured to process data in an awake state, and is also referred to as a CPU. The co-processor is a low power consumption processor configured to process the data in a standby state. In some embodiments, the processor may be integrated with a GPU, and the GPU is configured to render and draw content that needs to be displayed on a display screen. In some embodiments, the processor may include an artificial intelligence (AI) processor, and the AI processor is configured to process computing operations related to machine learning.

The memory may include one or more non-transitory readable storage media. The non-transitory readable storage medium may be non-transitory. The memory may further include a high-speed random access memory and a non-transitory memory, for example, one or more disk storage devices or flash storage devices. In this embodiment, the memory is configured at least to store the following computer program, wherein after the computer program is loaded and executed by the processor, relevant steps in the computing method that is performed on a terminal side that is disclosed in any one of the above embodiments may be implemented. In addition, a resource stored in the memory may further include an operating system, data, and the like, and a storage manner may be temporary storage or permanent storage. The operating system may include Windows, Unix, Linux, and the like. The data may include, but is not limited to, update information of an application.

In some embodiments, the terminal may further include the display screen, an input/output interface, a communication interface, a sensor, a power supply, and a communication bus.

The following describes a non-transitory readable storage medium provided in the embodiments of the present disclosure. The non-transitory readable storage medium described below and the other embodiments can be referenced mutually.

An embodiment of the present disclosure discloses a non-transitory readable storage medium, configured to store a computer program, wherein when the computer program is executed by a processor, the computing method disclosed in the above embodiment is implemented. As a carrier for resource storage, the non-transitory readable storage medium may be a read-only memory, a random access memory, a magnetic disk, an optical disk, or the like. A resource stored on the non-transitory readable storage medium includes an operating system, the computer program, data, and the like. A storage manner may be temporary storage or permanent storage.

In this embodiment, the computer program is executed by the processor to implement the following steps: generating a computing instruction for each matrix multiplication operation in a graph neural network, wherein a parallel count N and a write location of a matrix multiplication result of the corresponding matrix multiplication operation are set in the computing instruction; and sending the computing instruction to the above accelerator, so that the accelerator performs accelerated computing on the graph neural network.

In this embodiment, the computer program is executed by the processor to implement the following step: sending corresponding computing instructions in sequence to the accelerator according to a computing sequence of different matrix multiplication operations in the graph neural network.

In this embodiment, the computer program is executed by the processor to implement the following step: determining a value of the parallel count N based on a resource configuration of the computing core in the accelerator.

In this embodiment, the computer program is executed by the processor to implement the following steps: constructing a constraint formula based on the resource configuration of the computing core: $Count \geq N3/2$, and $BW \geq DW \times f \times N2$, wherein Count represents a computing resource count of the computing core, BW represents a memory access bandwidth of the computing core, DW represents a data bit width of the computing core, and f represents a computing clock frequency of the computing core; and determining the value of N based on the constraint formula.

The following describes a computing system provided in the embodiments of the present disclosure. The computing system described below and the other embodiments may be referenced mutually.

An embodiment of the present disclosure discloses a computing system, including a server and at least one above accelerator. The server is configured to generate a computing instruction for each matrix multiplication operation in a graph neural network, wherein a parallel count N and a write location of a matrix multiplication result of the corresponding matrix multiplication operation are set in the computing instruction; and send the computing instruction to any accelerator. The accelerator that receives the computing instruction performs accelerated computing on the graph neural network.

It can be learned that this embodiment provides the computing system. Memory access and time overheads of matrix transposition may be avoided, data reuse during computation may be implemented, a computing speed and computing efficiency of the matrix multiplication operation in the graph neural network may be improved, and flexible parallel scaling of the computing component may be implemented.

The embodiments set forth in this specification are described in a progressive manner, with each embodiment highlighting its distinctions from the others; identical or similar portions may be cross-referenced among the embodiments.

The steps of any method or algorithm disclosed herein may be implemented in dedicated hardware, in a software module executed by a processor, or in a combination thereof. A software module may reside in random-access memory (RAM), main memory, read-only memory (ROM), electrically programmable ROM (EPROM), electrically erasable programmable ROM (EEPROM), registers, a hard disk, a removable disk, a CD-ROM, or any other non-transitory computer-readable storage medium known in the art.

The above embodiments, which are presented solely by way of example to illustrate the principles and modes of implementation of the present disclosure, are not intended to be limiting. Persons skilled in the art may, in light of the teachings herein, effect various modifications to the embodiments, implementations, and fields of use without departing from the spirit and scope of the present disclosure. Consequently, the contents of this specification shall not be construed as imposing any restriction on the appended claims or their equivalents.

The invention claimed is:

1. A computing core, comprising a first cache component, a second cache component, a matrix multiplication computing component, and an output component;

the first cache component, configured to load data in a first matrix participating in a current matrix multiplication operation in a graph neural network from an external first memory according to a received computing instruction;

the second cache component, configured to load data in a second matrix participating in the current matrix multiplication operation from an external second memory according to the computing instruction;

the matrix multiplication computing component, configured to compute matrix multiplication results of N pieces of row data or N pieces of column data in the first matrix and N pieces of column data or N pieces of row data in the second matrix in parallel based on a parallel count N set in the computing instruction; and the output component, configured to temporarily store the matrix multiplication results, and write, in response to a data volume of the matrix multiplication results satisfying a preset write condition, the matrix multiplication results into the first memory or the second memory set in the computing instruction, and wherein a transmission bandwidth of the second memory is greater than that of the first memory; and in response to the matrix multiplication results needing to participate in computation in a traversal manner participating in each round of computation in a next matrix multiplication operation, the computing instruction is set with the second memory; or in response to the matrix multiplication results having no need to participate in computation in a traversal manner participating in each round of computation in a next matrix multiplication operation, the computing instruction is set with the first memory.

2. The computing core according to claim 1, wherein the first cache component is configured to load remaining unloaded data in the first matrix participating in the current matrix multiplication operation from the first memory during computation of the matrix multiplication results by the matrix multiplication computing component; and correspondingly, the second cache component is configured to load remaining unloaded data in the second matrix participating in the current matrix multiplication operation from the second memory during computation of the matrix multiplication results by the matrix multiplication computing component.

3. The computing core according to claim 1, wherein the first cache component loads the data in the first matrix in a ping-pong mode.

4. The computing core according to claim 1, wherein the second cache component loads the data in the second matrix using a first in first out queue.

5. The computing core according to claim 1, wherein the matrix multiplication computing component comprises at least one computing unit, and the computing unit comprises a multiplier and an accumulator, with a data volume per computation equal to N.

6. An accelerator, comprising a controller, a first memory, a second memory whose transmission bandwidth is greater than that of the first memory, and a computing core according to claim 1, wherein the controller is respectively connected to the first memory, the second memory, and the computing core, and the computing core is respectively connected to the first memory and the second memory;

the controller is configured to send a computing instruction for a matrix multiplication operation in a graph neural network to the first memory, the second memory, and the computing core;

the first memory is configured to obtain and store, in a direct memory access (DMA) mode according to the computing instruction, a first matrix participating in a current matrix multiplication operation;

the second memory is configured to obtain and store, in the DMA mode according to the computing instruction, a second matrix participating in the current matrix multiplication operation; and the computing core is configured to compute a matrix multiplication result of the first matrix and the second matrix according to the computing instruction.

7. The accelerator according to claim 6, wherein there are a plurality of computing cores.

8. The accelerator according to claim 7, wherein the controller is further configured to control the plurality of computing cores to perform a same matrix multiplication operation.

9. The accelerator according to claim 8, wherein the controller is configured to: in response to controlling the plurality of computing cores to perform the same matrix multiplication operation, cause each computing core to compute a matrix multiplication result of a same row of data or a same column of data in the first matrix and a different column of data or a different row of data in the second matrix in a same computing cycle.

10. The accelerator according to claim 8, wherein the controller is configured to: in response to controlling the plurality of computing cores to perform the same matrix multiplication operation, cause each computing core to compute a matrix multiplication result of a different column of data or a different row of data in the first matrix and a same column of data or a same row of data in the second matrix in a same computing cycle.

11. The accelerator according to claim 7, wherein the controller is further configured to control different computing cores to perform different matrix multiplication operations in a same computing cycle.

12. The accelerator according to claim 6, wherein the computing instruction is used to implement any matrix multiplication operation in the graph neural network.

13. A computing method, comprising:

generating a computing instruction for each matrix multiplication operation in a graph neural network, and wherein a parallel count N and a write location of a matrix multiplication result of the corresponding matrix multiplication operation are set in the computing instruction; and sending the computing instruction to an accelerator, so that the accelerator performs accelerated computing on the graph neural network, and wherein the accelerator comprises a controller, a first memory, a second memory whose transmission bandwidth is greater than that of the first memory, and a computing core; and the controller is respectively connected to the first memory, the second memory, and the computing core, and the computing core is respectively connected to the first memory and the second memory;

the controller is configured to send a computing instruction for a matrix multiplication operation in a graph neural network to the first memory, the second memory, and the computing core;

the first memory is configured to obtain and store, in a direct memory access (DMA) mode according to the computing instruction, a first matrix participating in a current matrix multiplication operation;

the second memory is configured to obtain and store, in the DMA mode according to the computing instruction, a second matrix participating in the current matrix multiplication operation; and the computing core is configured to compute a matrix multiplication result of the first matrix and the second matrix according to the computing instruction, and wherein the computing core comprises a first cache component, a second cache component, a matrix multiplication computing component, and an output component; and the first cache component is configured to load data in a first matrix participating in a current matrix multiplication operation in a graph neural network from an external first memory according to a received computing instruction;

the second cache component is configured to load data in a second matrix participating in the current matrix multiplication operation from an external second memory according to the computing instruction;

the matrix multiplication computing component, configured to compute matrix multiplication results of N pieces of row data or N pieces of column data in the first matrix and N pieces of column data or N pieces of row data in the second matrix in parallel based on a parallel count N set in the computing instruction; and the output component is configured to temporarily store the matrix multiplication results, and write, in response to a data volume of the matrix multiplication results satisfying a preset write condition, the matrix multiplication results into the first memory or the second memory set in the computing instruction, and wherein a transmission bandwidth of the second memory is greater than that of the first memory; and in response to the matrix multiplication results needing to participate in computation in a traversal manner participating in each round of computation in a next matrix multiplication operation, the computing instruction is set with the second memory; or in response to the matrix multiplication results having no need to participate in computation in a traversal manner participating in each round of computation in a next matrix multiplication operation, the computing instruction is set with the first memory.

14. The method according to claim 13, wherein the sending the computing instruction to an accelerator comprises:

sending the corresponding computing instruction in sequence to the accelerator according to a computing sequence of different matrix multiplication operations in the graph neural network.

15. The method according to claim 13, further comprising:

determining a value of the parallel count N based on a resource configuration of the computing core in the accelerator.

16. The method according to claim 15, wherein the determining a value of the parallel count N based on a resource configuration of the computing core in the accelerator comprises:

constructing a constraint formula based on the resource configuration of the computing core: $Count \geq N3/2$, and $BW \geq DW \times f \times N2$, and wherein Count represents a computing resource count of the computing core, BW represents a memory access bandwidth of the computing core, DW represents a data bit width of the computing core, and f represents a computing clock frequency of the computing core; and determining the value of N based on the constraint formula.

17. An electronic device, comprising:

a memory, configured to store a computer program; and a processor, configured to execute the computer program to implement a computing method; and the computing method, comprising:

generating a computing instruction for each matrix multiplication operation in a graph neural network, and wherein a parallel count N and a write location of a matrix multiplication result of the corresponding matrix multiplication operation are set in the computing instruction; and sending the computing instruction to an accelerator, so that the accelerator performs accelerated computing on the graph neural network; and wherein the accelerator comprises a controller, a first memory, a second memory whose transmission bandwidth is greater than that of the first memory, and a computing core; and the controller is respectively connected to the first memory, the second memory, and the computing core, and the computing core is respectively connected to the first memory and the second memory;

the controller is configured to send a computing instruction for a matrix multiplication operation in a graph neural network to the first memory, the second memory, and the computing core;

the first memory is configured to obtain and store, in a direct memory access (DMA) mode according to the computing instruction, a first matrix participating in a current matrix multiplication operation;

the second memory is configured to obtain and store, in the DMA mode according to the computing instruction, a second matrix participating in the current matrix multiplication operation; and the computing core is configured to compute a matrix multiplication result of the first matrix and the second matrix according to the computing instruction; and wherein the computing core comprises a first cache component, a second cache component, a matrix multiplication computing component, and an output component; and the first cache component is configured to load data in a first matrix participating in a current matrix multiplication operation in a graph neural network from an external first memory according to a received computing instruction;

the second cache component is configured to load data in a second matrix participating in the current matrix multiplication operation from an external second memory according to the computing instruction;

the matrix multiplication computing component, configured to compute matrix multiplication results of N pieces of row data or N pieces of column data in the first matrix and N pieces of column data or N pieces of row data in the second matrix in parallel based on a parallel count N set in the computing instruction;

the output component is configured to temporarily store the matrix multiplication results, and write, in response to a data volume of the matrix multiplication results satisfying a preset write condition, the matrix multiplication results into the first memory or the second memory set in the computing instruction, and wherein a transmission bandwidth of the second memory is greater than that of the first memory; and in response to the matrix multiplication results needing to participate in computation in a traversal manner participating in each round of computation in a next matrix multiplication operation, the computing instruction is set with the second memory; or in response to the matrix multiplication results having no need to participate in computation in a traversal manner participating in each round of computation in a next matrix multiplication operation, the computing instruction is set with the first memory.

18. The electronic device according to claim 17, wherein the sending the computing instruction to an accelerator comprises:

sending the corresponding computing instruction in sequence to the accelerator according to a computing sequence of different matrix multiplication operations in the graph neural network.

19. The electronic device according to claim 17, further comprising:

determining a value of the parallel count N based on a resource configuration of the computing core in the accelerator.

20. The electronic device according to claim 19, wherein the determining a value of the parallel count N based on a resource configuration of the computing core in the accelerator comprises:

constructing a constraint formula based on the resource configuration of the computing core: $Count \geq N3/2$, and $BW \geq DW \times f \times N2$, and wherein Count represents a computing resource count of the computing core, BW represents a memory access bandwidth of the computing core, DW represents a data bit width of the computing core, and f represents a computing clock frequency of the computing core; and determining the value of N based on the constraint formula.

* * * * *